UNITED STATES PATENT OFFICE.

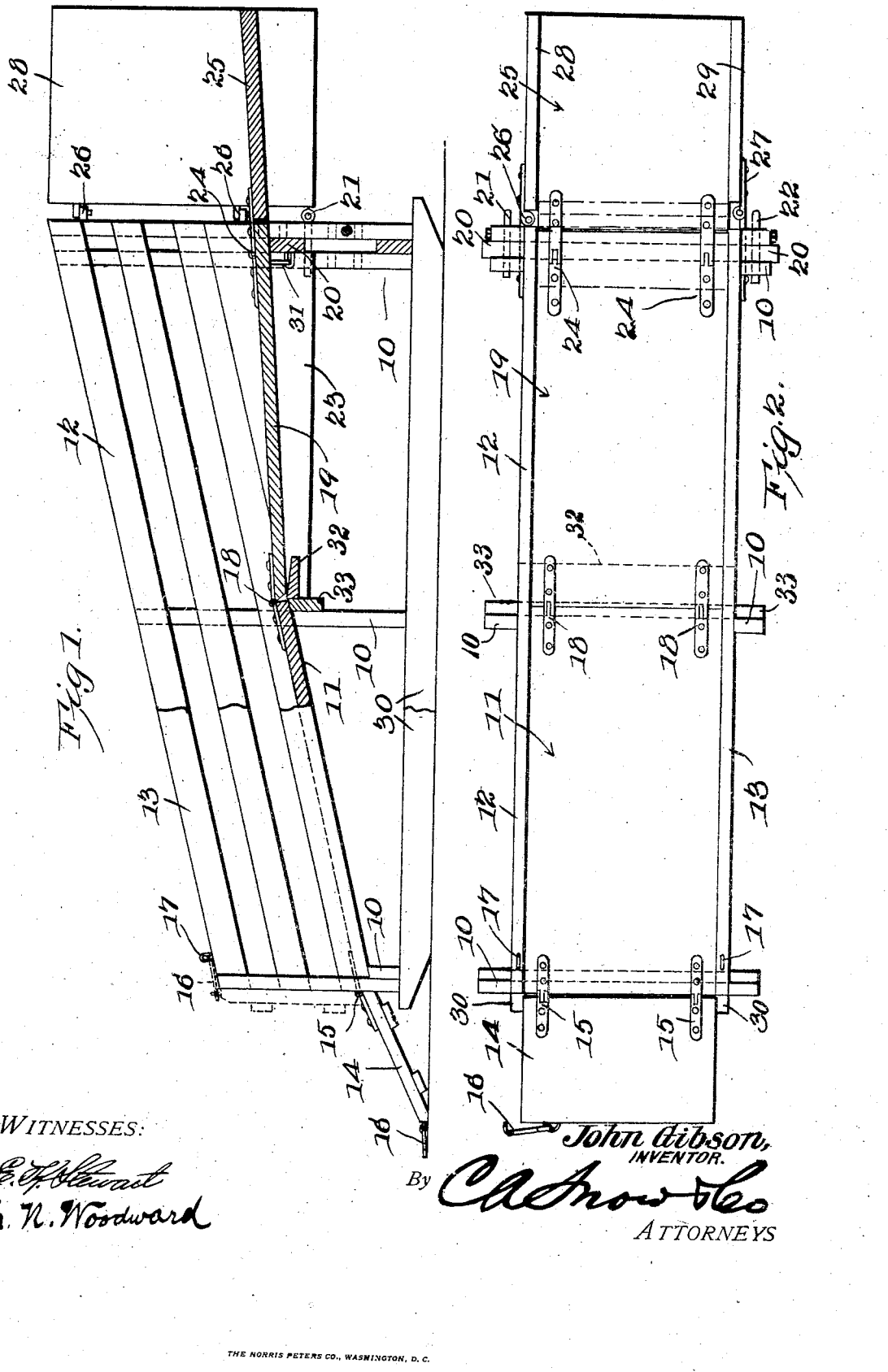

JOHN GIBSON, OF STAR PRAIRIE, WISCONSIN.

STOCK-LOADER.

No. 850,640.   Specification of Letters Patent.   Patented April 16, 1907.

Application filed May 4, 1906. Serial No. 315,242.

*To all whom it may concern:*

Be it known that I, JOHN GIBSON, a citizen of the United States, residing at Star Prairie, in the county of St. Croix and State of Wisconsin, have invented a new and useful Stock-Loader, of which the following is a specification.

This invention relates to devices for loading stock upon cars, wagons, or other vehicles or transferring them from one vehicle to another, and has for its object to improve the construction and increase the efficiency and utility of devices of this character.

With these and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a longitudinal sectional view. Fig. 2 is a plan view.

The improved device comprises a supporting-frame 10, a chute or runway formed with an inclined bottom portion 11 extending part way of the length of the framework, and inclined side portions formed of spaced slats 12 13, the sides extending the whole length of the frame. At its lower end the inclined chute structure is provided with an extension 14, hinged to the bottom 11 at 15, the extension designed when in its lower position to form an inclined guideway over which the animals will pass in entering the chute. When not in use, the member 14 is folded against the lower end of the chute and is provided with hooks 16 for engaging staples 17 on the side members 12 13 to hold it in closed position.

Hinged at 18 to the inner end of the inclined bottom 11 is a movable bottom portion 19, continuing the bottom portion 11 and extending to the higher end of the framework. The inner or higher end of the stationary floor-section 11 is carried by a transverse frame member 33, and extending transversely of the frame is another supporting member 32, upon which the hinged end of the movable floor-section 19 rests and which thus receives the downward strains and relieves the hinges 18 largely from the vertical strains. The weight of the animals passing through the chute is thus borne almost entirely by the transverse members 33 32 when they are passing through the central portion of the device. At its higher end the framework is formed with spaced vertical members, and extending between these spaced members is a transverse bar 20, upon which the free end of the movable bottom member 19 rests. The spaced members between which the bar 20 extends are each provided with spaced transverse apertures to receive stop-pins 21 22 to support the bar 20 at any desired point. By this simple means the movable floor-section 19 may be adjusted vertically at its movable end to any required extent to adapt the device to the height of the car or other vehicle into which the stock is to be loaded.

The lowermost of the slats 12 13 are extended downwardly opposite the movable section 19, as represented at 23, so that when floor-the floor-section 19 is in its lowermost position openings will not be formed below the side slats, for obvious reasons. Hinged at 24 to the free end of the movable floor-section 19 is an extension 25, foldable over upon the section 19 and between the sides 12 13 when not in use. Hinged at 26 27 to the upper or higher ends of the frame member are side wings 28 29, forming extensions to the side slats 12 13. The wings 28 29 extend at their lower edges below the lowest point to which the floor-section 19 may be adjusted and bear against the side edges of the member 25 when in open position. The three members 25, 28, and 29 when projected thus form a continuation of the chute structure, as shown. The wings 28 29 are foldable inwardly and overlapping each other transversely of the chute structure when not in use and when section 25 is in folded position between the side members, as indicated by dotted lines in Fig. 2.

The frame 10 is provided at the lower end with sill members or "runners," one of which is represented at 30, and with the ends inclined, so that the whole device may be drawn over the ground from place to place as required.

The improved device is designed for use more particularly upon stock-farms and enables the farmer or stock-raiser to very readily transfer animals from the ground to a vehicle or from the vehicle to the ground or from one vehicle to another, as may be required.

The device may be employed for loading animals upon cars, wagons, sleighs, or other vehicles.

The supporting-bar 20 is preferably suspended from the movable floor-section 19 by linked staples, as at 31, in Fig. 1.

Having thus described the invention, what is claimed as new is—

1. In a device of the class described, a supporting-frame including transverse members intermediately thereof and spaced vertical members at the discharge end, continuous spaced side members carried by said frame, an inclined stationary floor-section disposed between said sides and extending inwardly from the receiving end and bearing at the inner end upon one portion of said transverse frame members, a movable floor-section swinging from the inner end of the stationary floor-section and bearing upon the remainder of said transverse frame members and extending to the discharge ends of said sides, a supporting-bar extending between said spaced vertical members and bearing beneath the free end of said movable floor-section, and means for coupling said bar adjustably to said spaced vertical members.

2. In a device of the class described, a supporting-frame including transverse members intermediately thereof and spaced vertical members at the discharge end, continuous spaced side members carried by said frame, an inclined stationary floor-section disposed between said sides and extending inwardly from the receiving end and bearing at the inner end upon one portion of said transverse frame members, a movable floor-section swinging from the inner end of the stationary floor-section and bearing upon the remainder of said transverse frame members and extending to the discharge ends of said sides, a supporting-bar extending between said spaced vertical members and bearing beneath the free end of said movable floor-section, flexible connecting means between said bar and the movable floor-section, and means for adjustably coupling said bar to said spaced vertical members.

In testimony that I claim the foregoing as my own I have hereto affixed my signature in the presence of two witnesses.

JOHN GIBSON.

Witnesses:
J. P. BARNHART,
L. E. JOHNSON.